April 21, 1942.  H. FORSYTH  2,280,511
POULTRY ROOST
Filed Aug. 11, 1941
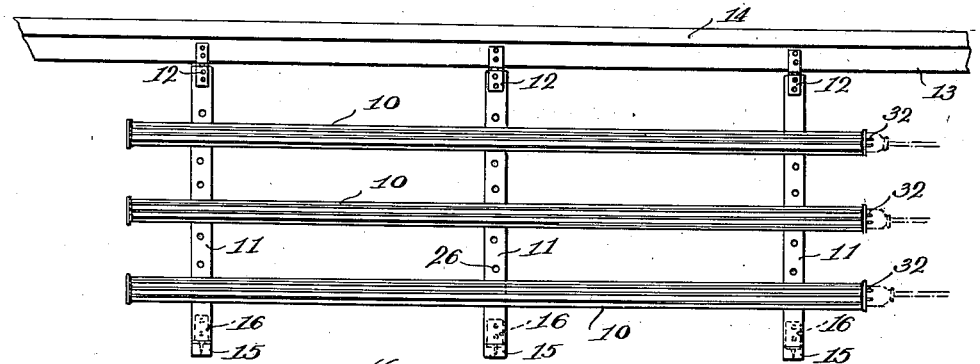
Fig. 1.
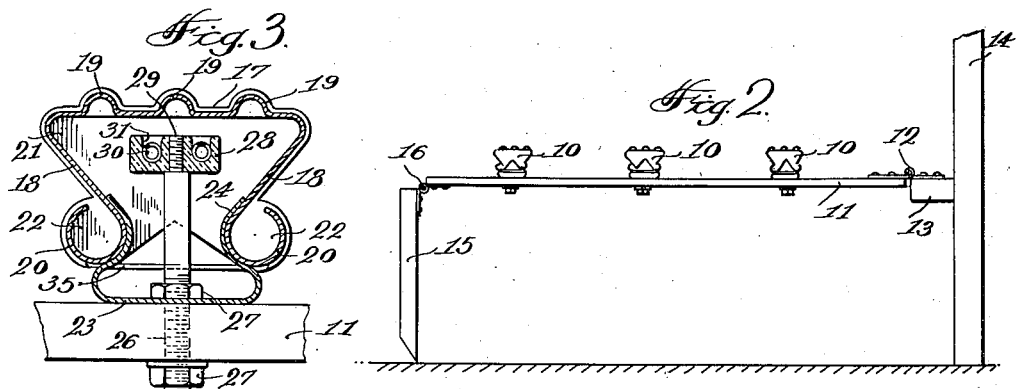
Fig. 3.
Fig. 2.
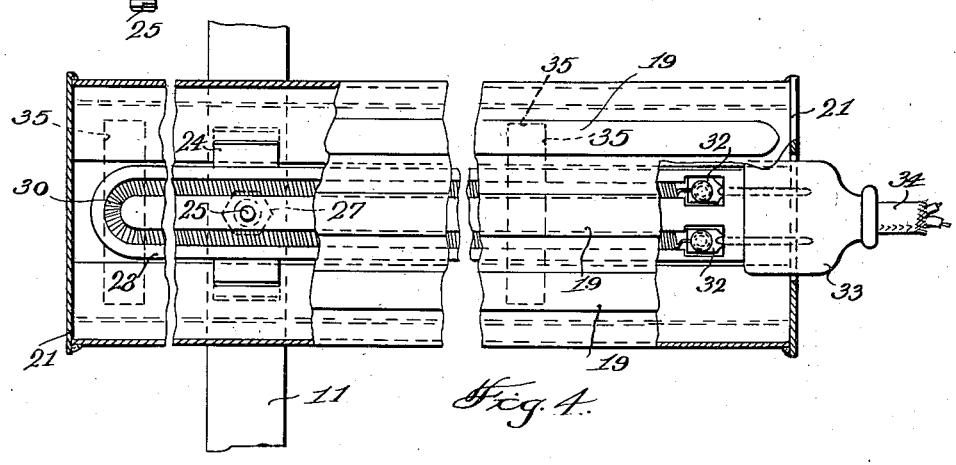
Fig. 4.
INVENTOR.
Harry Forsyth
BY
Victor J. Evans & Co.
ATTORNEYS Patented Apr. 21, 1942

2,280,511

UNITED STATES PATENT OFFICE 2,280,511

POULTRY ROOST

Harry Forsyth, Prosser, Wash.

Application August 11, 1941, Serial No. 406,377

2 Claims. (Cl. 119—25)

This invention relates to a poultry roost of that general type described in my application of the same title filed December 9, 1940, Serial No. 369,309, issued September 16, 1941, as Patent No. 2,256,259.

An object of the present invention is to improve my prior structure by the provision of adjustable spring clamps engaging the inner sides of the roost bar, the roost bar itself having the insecticide troughs opening outside of the roost bar thus eliminating perforations in the roost bar, the roost bar itself having a flat top provided with longitudinal struck up ribs to permit the poultry obtaining a better grip on the roost bar.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a plan view of a poultry roost embodying roost bars constructed in accordance with the invention.

Figure 2 is an end elevation of the poultry roost shown in Figure 1.

Figure 3 is an enlarged cross sectional view of the roost bar.

Figure 4 is a top plan view of the roost bar shown in Figure 3 with portions broken away.

Referring now to the drawing in which like characters of reference designate similar parts in the various views, 10 designates a plurality of roost bars connected at intervals by cross bars 11, which latter are hinged, as shown at 12 to a supporting bar 13 secured to a wall 14 of the poultry pen at a predetermined height above the floor. Props 15, equal in number to the number of cross bars 11, are hingedly connected at the upper ends to the cross bars as shown at 16. The props are of sufficient height to hold the cross bars 11 horizontal.

Each roost bar 10 is formed from a sheet metal shell having a flat top 17 and having its sides 18 inclined downwardly and inwardly. The flat top of the roost bar is provided with struck up ribs 19 which enable the poultry to obtain a firm grip on the roost bar. The lower portions of the inwardly inclined sides of the roost bar are turned upwardly and then inwardly to provide troughs 20 for an insecticide. The troughs are open at the top, exteriorly of the roost bar, so that the fumes from the insecticide can be deflected by the inclined sides 18 of the roost bar to pass upwardly on both sides of the roost bar to delouse the poultry. The ends of the roost bar are closed by end walls 21 which are provided with extensions 22 which close the ends of the troughs, see Figure 3.

The roost bar is adapted to be supported by a plurality of spring clips 23 located between the troughs and having the lateral sides bent upwardly and outwardly to provide jaws 24 which engage the troughs inside the roost bar. The spring clips may be adjusted longitudinally of the roost bar by simply sliding the clips longitudinally of the roost bar.

The clips are secured to the aforesaid cross bars 11 by respective bolts 25. Each bolt is engaged through a respective opening 26 in the cross bar, see Figures 1 and 3, and is provided with a pair of nuts 27 which respectively engage the upper surface of the clip, and the upper surface of the cross bar, to clamp the clip to the cross bar.

A bar 28 of insulating material is supported longitudinally within each roost bar by threaded studs 29 formed on the upper ends of the bolts 25, engaged in openings in the bar. An electric resistance coil 30, see Figure 4, is disposed in a channel 31 formed in the top face of the bar. The ends of the coil are connected to prongs 32, which are received in the socket of a plug connector 33 which is connected by a cable 34 to any suitable source of electricity, for heating the roost bar in cold climates.

A plurality of short cross bars 35 are disposed at the bottom of the roost bar and extend between the troughs. The bars are secured at the ends to the bottoms of the troughs, see Figure 3. These cross bars reinforce the troughs against dislodgement from parallel relationship.

From the above description it is thought that the construction and operation of the invention will be fully understood without further explanation.

What is claimed is:

1. A roost bar formed of sheet metal having a flat top and sides inclined downwardly and inwardly, the top of the roost bar being provided with struck up beads to enable poultry to obtain a firm grip on the roost, the lower portions of the inwardly inclined sides of the roost bar being turned upwardly and then inwardly to provide troughs for insecticide opening on the exterior of the roost bar, end walls closing the ends of the roost bar and the troughs, spring clips engaging the roost bar at the troughs, and bolts carried by the spring clips for securing the spring clips to a support.

2. The structure as of claim 1 and in which said spring clips are provided at the sides with curved jaws extending into the interior of the roost bar and engaging the troughs.

HARRY FORSYTH.